T. L. BURTON.
CLASP BRAKE RIGGING.
APPLICATION FILED JAN. 3, 1916.

1,199,870.

Patented Oct. 3, 1916.

INVENTOR
T. L. Burton
BY
Edward Wright.
ATTORNEY

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

CLASP BRAKE-RIGGING.

1,199,870.  Specification of Letters Patent.  Patented Oct. 3, 1916.

Application filed January 3, 1916. Serial No. 69,981.

*To all whom it may concern:*

Be it known that I, THOMAS L. BURTON, a citizen of the United States, and a resident of St. Louis, in the State of Missouri, have invented a certain new and useful Improvement in Clasp Brake-Rigging, of which improvement the following is a specification.

This invention relates to brake rigging of the clasp type, adapted to be employed on pivoted railway trucks having a plurality of pairs of wheels, and brake beams and shoes applied to both sides of each pair of wheels.

The object of my invention is to provide an improved construction of this type, in which duplicate sets of substantially horizontal truck levers are employed, one set at each side of the truck below the car axles, and having one or more substantially vertical intermediate levers located between the axles and having connections at their lower ends to the truck levers, and adapted to transmit the power in opposite directions from said intermediate levers through the sets of truck levers toward opposite ends of the truck. This improved design is particularly applicable to certain forms of truck frames since the brake rigging may thus be located below the members of the frame and not interfere therewith.

Figure 1:
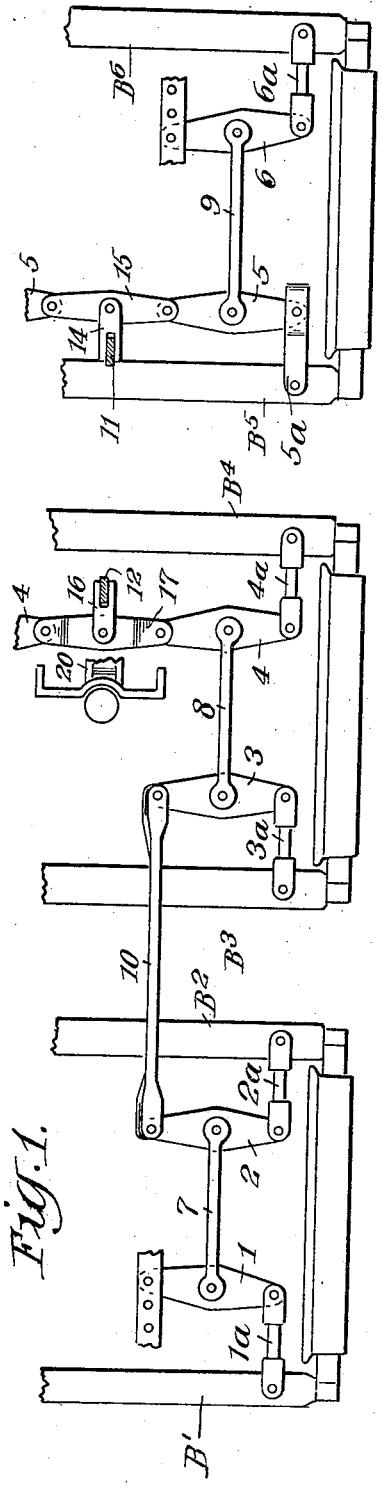
Figure 2:
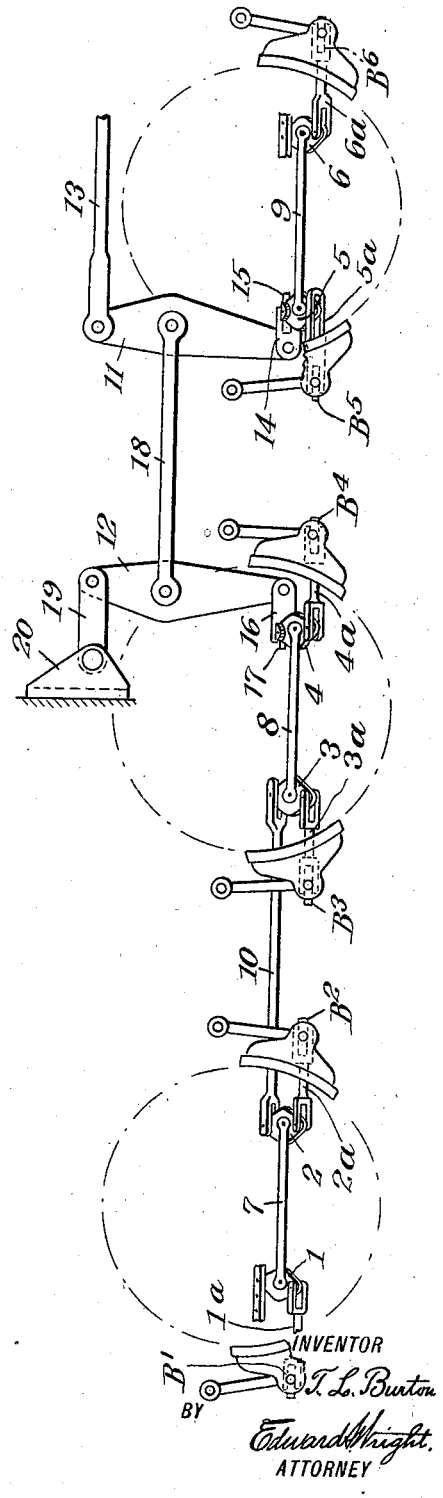

In the accompanying drawing: Figure 1 is a half plan of one form of clasp type brake rigging embodying my improvement, and applied to a six wheeled truck, the intermediate vertical levers being shown in horizontal section; and Fig. 2, a side elevation.

According to this preferred construction, improvement is applied to a six wheeled truck having brake beams, $B^1$, $B^2$, $B^3$, $B^4$, $B^5$ and $B^6$, carrying brake shoes at their ends and located at both sides of each pair of wheels, with duplicate sets of substantially horizontal truck levers, 1, 2, 3, 4, 5 and 6, upon opposite sides of the truck, and approximately in the same plane with the brake beams below the axles of the wheels, there being a pair of truck levers for each brake beam, and preferably connected thereto by suitable links, such as $1^a$, $2^a$, $3^a$, $4^a$, $5^a$ and $6^a$, respectively. The truck levers for each pair of wheels are connected together by the respective tie rods, 7, 8 and 9, while the adjacent truck levers, 2 and 3, are connected by the rod, 10.

For the purpose of operating the sets of truck levers, I provide one or more substantially vertical intermediate levers located between the axles, such as the intermediate floating lever, 11, and dead lever, 12. The lever 11 is connected at its upper end to pull rod, 13, for transmitting the power from the brake cylinder or other source, and is coupled at its lower end, through link, 14, and equalizer, 15, to the duplicate truck levers, 5, one at each side of the truck, as will be readily understood. The intermediate dead lever 12, has a fixed fulcrum at its upper end, while its lower end is coupled through link, 16, and equalizer 17, to the duplicate truck levers, 4, at each side of the truck. The upper end of lever, 12, may be pivotally attached by a link, 19, to the fixed bracket, 20, at or near the center pivot of the truck. The intermediate levers, 11 and 12, are coupled together by tie rod, 18.

While I have shown the intermediate vertical levers as inserted between the truck levers, 4 and 5, it is obvious that they could be inserted at some other point, if preferred and operate to transmit the breaking stresses in opposite directions through the truck lever system.

As the power is applied from the brake cylinder pull rod to the intermediate live lever 11, and through coupling rod, 18, to the dead lever, 12, it will be seen that the lower ends of said levers are moved in opposite directions, the one actuating the truck levers and brake beams toward one end of the truck, and the other applying the power through the truck levers and brake beams toward the opposite end of the truck. In this manner, the rod connections to the truck levers are subjected to tension stresses only, and equalized braking pressure may be applied to all of the brake shoes.

It will be observed that the truck levers and their rod connections are all located in substantially the same plane with the brake beams below the axles and below the members of the truck frame, whereby this improved design of brake rigging is particularly applicable to certain complex truck designs, since there is rarely any difficulty in inserting the pair of intermediate vertical levers between the members of the truck frame. The fixed fulcrum for the intermediate dead lever is preferably located close to the center pivot of the truck in order to eliminate as much as possible any irregularity in braking stresses due to the swiveling action of the truck upon curves in the track. It will be understood that the brake rigging may be slidably supported upon suitable guides attached to the truck frame, these members being omitted from the drawing.

Having now described my invention, what I claim as new and desire to secure by Letters Patent is:

1. In a brake rigging for trucks having a plurality of pairs of wheels, the combination with brake shoes applied to both sides of each pair of wheels, and a double set of horizontal truck levers and connecting rods, one set at each side of the truck and located below the plane of the axles, of an intermediate vertical floating lever inserted between axles and having connections for transmitting stresses in opposite directions through the truck lever system toward the opposite ends of the truck, all of said rod connections being tension members.

2. In a brake rigging for trucks having a plurality of pairs of wheels, the combination with brake shoes applied to both sides of each pair of wheels, and a double set of horizontal truck levers and connecting rods, one set at each side of the truck and located below the plane of the axles, of a pair of connected vertical levers inserted at an intermediate point and having their lower ends connected to adjacent truck levers for transmitting the stresses through said horizontal truck lever system toward the opposite ends of the truck.

3. In a brake rigging for trucks having a plurality of pairs of wheels, the combination with brake shoes applied to both sides of each pair of wheels, and a double set of horizontal truck levers and connecting rods, one set at each side of the truck and located below the plane of the axles, of an intermediate vertical floating lever having its lower end connected to one of the truck levers and a pull rod connection at its upper end, and another intermediate vertical lever having a fixed fulcrum and connected at its lower end to another truck lever.

4. In a brake rigging for trucks having a plurality of pairs of wheels, the combination with brake shoes applied to both sides of each pair of wheels, and a double set of horizontal truck levers and connecting rods, one set at each side of the truck and located below the plane of the axles, of a pair of intermediate vertical levers located between truck levers of adjacent pairs of wheels and having connections at their lower ends with said respective truck levers.

5. In a brake rigging for six wheeled trucks, the combination with brake beams applied to both sides of each pair of wheels, and a double set of horizontal truck levers, one set on each side and located below the plane of the axles, each lever having a tension link connection with its corresponding brake beam, of a pair of intermediate vertical levers located between adjacent truck levers and connected thereto at their lower ends, and connecting rods for said truck levers.

6. In a brake rigging for six wheeled trucks, the combination with brake beams applied to both sides of each pair of wheels, and a double set of horizontal truck levers, one set on each side and located below the plane of the axles, each lever having a tension link connection with its corresponding brake beam, of a pair of intermediate vertical levers located between the truck levers of adjacent pairs of wheels and having connections at their lower ends, with said respective truck levers, one of said intermediate levers having a fixed fulcrum, a tie rod connecting said intermediate levers, and connecting rods for the truck levers.

In testimony whereof I have hereunto set my hand.

THOMAS L. BURTON.